United States Patent
De La Cruz et al.

(10) Patent No.: US 6,639,449 B1
(45) Date of Patent: Oct. 28, 2003

(54) ASYNCHRONOUS GLITCH-FREE CLOCK MULTIPLEXER

(75) Inventors: Louis De La Cruz, Pflugerville, TX (US); Chris Hume, Austin, TX (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 0 days.

(21) Appl. No.: 10/278,415

(22) Filed: Oct. 22, 2002

(51) Int. Cl.[7] .............................................. H03K 17/62
(52) U.S. Cl. ......................................... 327/407; 327/99
(58) Field of Search .......................... 327/99, 407, 170, 327/263, 165, 291–294, 298

(56) References Cited

U.S. PATENT DOCUMENTS

| | | | | |
|---|---|---|---|---|
| 6,111,437 A | * | 8/2000 | Patel | 327/74 |
| 6,239,626 B1 | * | 5/2001 | Chesavage | 327/99 |
| 6,300,809 B1 | * | 10/2001 | Gregor et al. | 327/200 |
| 6,411,135 B2 | * | 6/2002 | Komoto | 327/99 |
| 6,496,050 B2 | * | 12/2002 | Lloyd | 327/407 |

\* cited by examiner

Primary Examiner—My-Trang Nu Ton
(74) Attorney, Agent, or Firm—MacPherson Kwok Chen & Heid LLP (57) ABSTRACT

A clock multiplexer selects between two asynchronous clock signal inputs to produce a clock signal output such that the clock signal input corresponding to the clock signal output may be denoted as the current clock signal and the remaining clock signal input may be denoted as the selected clock signal. After detecting an edge of a specified type in the current clock signal, the clock multiplexer holds the clock signal output either high or low according to the specified type of clock edge being detected. After detecting an edge of the specified type in the selected clock signal, the clock signal output is released and the selected clock signal allowed to pass.

17 Claims, 10 Drawing Sheets

| STATE TABLE | | | | | | | | | | | | | | |
|---|---|---|---|---|---|---|---|---|---|---|---|---|---|---|
| MUX CONTROLLER | 0 | 1 | | | | | | 0 | 1 | | | | 0 | 1 |
| HOLD EDGE DETECTOR 0 | | | 7 | 8 | | | | | | | | | | |
| HOLD EDGE DETECTOR 1 | | | 16 | 17 | 15 | | | | | 17 | | | | 15 |
| READY EDGE DETECTOR 0 | 8 | | 0 | | | 5 | 6 | 5 | | | | 5 | | | |
| READY EDGE DETECTOR 1 | 1 | 0 | | | 0 | | 1 | | | 1 | | 0 | | 0 |

| MUX CONTROLLER | 1 | | 2 | | 3 | | | | | | |
|---|---|---|---|---|---|---|---|---|---|---|---|
| HOLD EDGE DETECTOR 0 | 0 | 6 | 5 | 6 | 5 | 6 | | 5 | | 6 | 5 |
| HOLD EDGE DETECTOR 1 | 15 | 0 | 8 | 1 | 0 | 1 | 1 | 0 | 1 | 0 | 0 |
| READY EDGE DETECTOR 0 | 5 | 1 | 0 | 1 | 0 | 1 | 5 | 0 | 5 | 1 | 5 |
| READY EDGE DETECTOR 1 | 0 | 1 | 6 | | 5 | | | | | | |

STATE TABLE

| | MUX CONTROLLER | HOLD EDGE DETECTOR 0 | HOLD EDGE DETECTOR 1 | READY EDGE DETECTOR 0 | READY EDGE DETECTOR 1 |
|---|---|---|---|---|---|
| | 3 | 6 | 0 | 1 | 5 |
| | | | 7 | | 0 |
| | | | 8 | | |
| | | 5 | | 1 | |
| | | | | | |
| | | | | 5 | |

STATE TABLE

ASYNCHRONOUS GLITCH-FREE CLOCK MULTIPLEXER

FIELD OF INVENTION

This invention relates to clock multiplexers and more particularly to a clock multiplexer that may select between asynchronous clock signals without producing glitches in the selected clock signal output.

BACKGROUND

Depending upon design, a circuit may need to select its clock signal from a plurality of available clock signals that are asynchronous to one another. In such a situation, the transition from one clock signal to another may produce a clock signal having a "glitch" component. Such glitches include "runt" pulses, i.e., pulses whose high or low state has a duration shorter than the shortest corresponding pulse width of the available clock signals. Alternatively, a glitch may be just a spike or other transitory signal. Regardless of their form, glitches may wreak havoc because of the sensitivity of digital circuitry to clock specifications such as rising or falling clock edges.

To address the glitch problem, a number of clock selection circuits have been developed. Because of metastability problems, these circuits typically suffer from latency (multiple clock cycle delays to effect a clock switch). Also, these circuits typically demand a significant amount of die area. Accordingly, there is a need in the art for clock selection circuitry with improved delay and die area demands.

SUMMARY

A clock multiplexer system selects between two clock input signals to produce a current output clock signal responsive to a selection signal. The input clock signal corresponding to the current output clock signal may be denoted as the current clock signal, and the remaining clock signal input may be denoted as the selected clock signal. Upon indication by the selection signal, the clock multiplexer system selects and passes the selected clock signal. This selection may occur in response to either a rising or falling edge in the clock input signals.

Should the selection be responsive to a falling edge in the clock input signals, the clock multiplexer system detects the first falling edge in the current clock signal subsequent to an indication in the selection signal. The clock output signal may then be held low while the clock multiplexer system waits for the first falling edge in the selected clock signal subsequent to the detection of the first falling edge in the current clock signal. When the clock multiplexer system detects this first falling edge in the selected clock signal, the clock multiplexer system unlatches the current output clock signal and passes the remaining clock signal.

Should the selection of the current clock signal output be responsive to a rising edge in the input clock signal, the clock multiplexer system detects the first rising edge in the current clock signal subsequent to a change in the selection signal. The clock output signal may then be latched high while the clock multiplexer system waits for the first rising edge in the selected clock signal subsequent to the detected rising edge in the current clock signal. When the rising edge in the selected clock signal is detected, the clock multiplexer system unlatches the clock signal output and passes the remaining clock signal.

DETAILED DESCRIPTION

Figure 1:
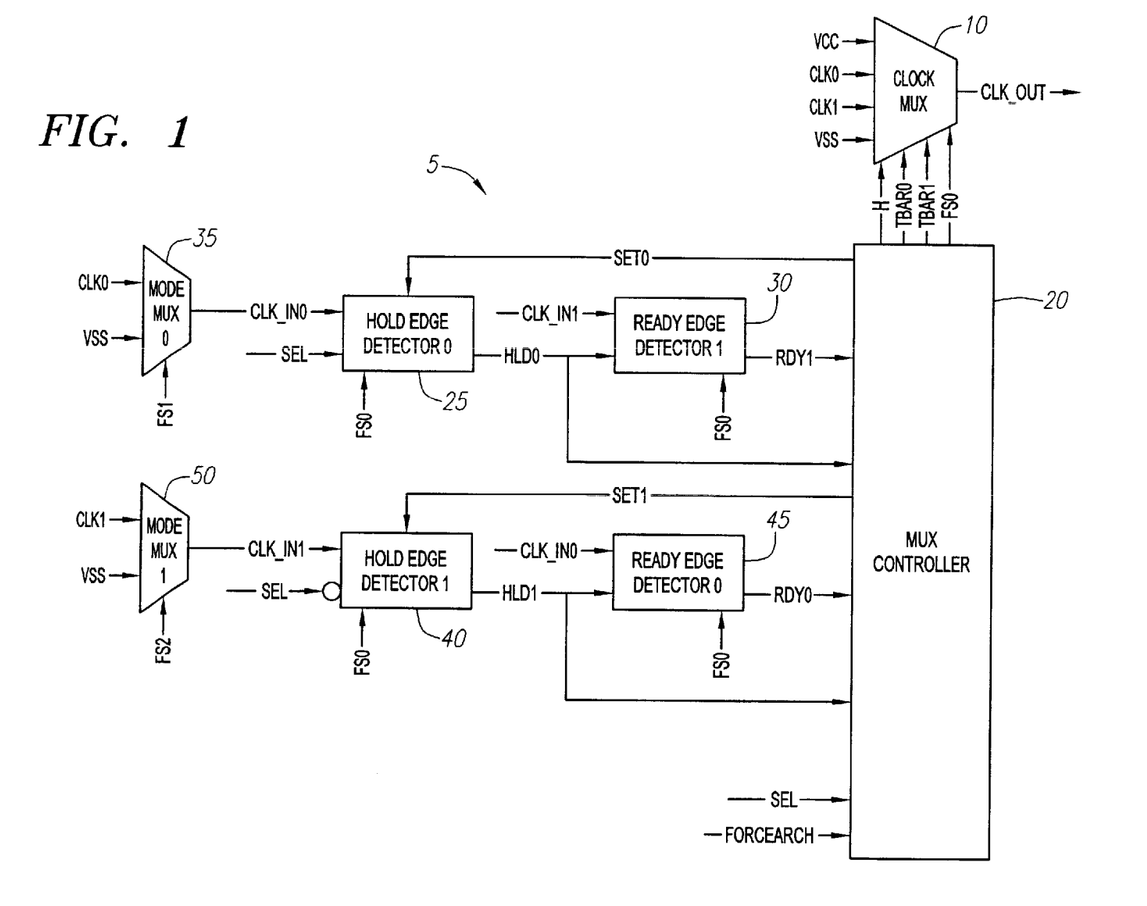
FIG. 1 is a block diagram of a clock multiplexer system according to one embodiment of the invention.

FIG. 1 is a block diagram of a glitch-free clock multiplexer system 5 according to one embodiment of invention. A clock multiplexer 10 selects between a first and a second input clock signal denoted as clk0 and clk1, respectively, to provide a clock output signal, clk_out. In addition, clock multiplexer 10 may also select VCC (high) or VSS (ground) as the clock output signal, clk_out. Clock multiplexer 10 selects the appropriate input to be clock output signal clk_out under the control of multiplexer controller 20. In turn, multiplexer controller 20 commands clock multiplexer 10 as determined by the state of two hold signals: hld0 and hld1, and two ready signals: rdy1 and rdy0. Multiplexer controller 20 controls clock multiplexer 10 using signals h, tbar0, and tbar1. Each ready signal is provided by a parallel set of edge detector circuits each comprising a hold edge detector and a ready edge detector. For example, a hold edge detector 0 circuit 25 and a ready edge detector 1 circuit 30 determine the state of the ready signal rdy1 (as will be explained further herein, each hold edge detector does not directly determine the state of its corresponding ready signal but rather does so indirectly by signaling to its corresponding ready edge detector with a hold signal). Ready signal rdy0 is determined by another set of edge detector circuits: a hold edge detector 1 circuit 40 and a ready edge detector 0 circuit 45. Hold edge detector 0 circuit 25 receives a clock input signal clk_0 selected by mode multiplexer 0 circuit 35 and provides a hold signal hld0 to ready edge detector 1 circuit 35. Mode multiplexer 0 circuit 35 may select between clock signal clk0 and VSS. Hold edge detector 1 circuit 40 receives a clock input signal selected by mode multiplexer 1 circuit 50 and provides a hold signal hld1 to ready edge detector 0 circuit 45. Mode multiplexer 1 circuit 50 may select between clock signal clk1 and VSS. Both hold edge detector circuits 40 and 25 receive a selection signal sel that will ultimately determine which clock signal is selected by clock multiplexer 10. In embodiments wherein the hold edge detector circuits 25 and 40 have a generic structure, the selection signal sel is inverted before coupling to one of the hold edge detectors (in clock multiplexer system 5, selection signal sel is inverted at its input to hold edge detector 1 circuit 40).

Clock multiplexer system 5 has two main modes of operation: falling-edge-triggered and rising-edge-triggered. In the falling-edge-triggered mode, a selection multiplexer (not illustrated) selects signal sel as the selection signal sel_in. The clock output signal clk_out is either of the clock signals clk0 or clk1 and will function as the current clock for whatever system using the clock output signal as its clock signal. Thus, should clk_out be clk0, then clk0 may be denoted the current clock signal. Clock signal clk1 would then be the remaining clock signal which becomes the selected clock signal when selection signal sel is toggled. After the selection signal sel toggles in the falling-edge-triggered mode, the appropriate hold edge detector circuit will find the falling edge on the current clock signal. For example, if the clock output signal clk_out is clk0, then hold edge detector 0 circuit 25 will detect the falling edge on clk0. Conversely, if the clock output signal clk_out is clk1, then hold edge detector 1 circuit 40 detects the falling edge on clk1. When the falling edge is detected, clock multiplexer 10 is latched low to signal VSS. It will be appreciated that although clock multiplexer 10 is described herein as "latching" or "unlatching" its output clock signal, no limitation in structure is suggested other than that required to either hold the output clock signal to a specified logic state or to release such a hold. Upon detecting the falling edge on the current clock signal, the appropriate hold edge detector then signals, by changing the state of its hold signal, that its corresponding ready edge detector should determine the falling edge on the selected clock signal. Then this corresponding ready edge detector circuit determines the falling edge on the selected clock signal. For example, when switching from clock signal clk0 to clock signal clk1, ready edge detector 1 circuit 30 would detect the falling edge on clock signal clk1 (subsequent to the change in hold signal hld0). After the falling edge on the selected clock is detected, the clock output signal is unlatched and the selected clock signal is passed by clock multiplexer 10. Thus, when switching from clock signal clk0 to clock signal clk1, clock multiplexer 10 would pass clock signal clk1 at this point. Similarly, if the current clock signal is clk1 and the selection signal sel is toggled, then hold edge detector 1 circuit 40 will detect the falling edge on clock signal clk1 and then change the state of hold signal hld1. When the falling edge on clock signal clk1 is detected, the clock output signal from clock multiplexer 10 is latched low to signal VSS. Ready edge detector 0 circuit 45 then detects the falling edge on clock signal clk0 (subsequent to the change in hold signal hld1). After the falling edge on clock signal clk0 is detected, clock output signal clk_out is unlatched so that clock multiplexer 10 may pass clock signal clk0 as the clock output signal clk_out.

The rising-edge-triggered mode operates analogously to the falling-edge-triggered mode. In the rising-edge-triggered mode, the selection multiplexer (not illustrated) selects signal sel as the selection signal sel_in. The clock output signal clk_out is either of the clock signals clk0 or clk1 and will function as the current clock for whatever system using the clock output signal as its clock signal. Thus, should clk_out be clk0, then clk0 may be denoted the current clock signal. Clock signal clk1 would then be the remaining clock signal which becomes the selected clock signal when selection signal sel is toggled. After the selection signal sel toggles in the rising-edge-triggered mode, the appropriate hold edge detector circuit will find the rising edge on the current clock signal. For example, if the clock output signal clk_out is clk0, then hold edge detector 0 circuit 25 will detect the rising edge on clk0. Conversely, if the clock output signal clk_out is clk1, then hold edge detector 1 circuit 40 detects the rising edge on clk1. When the rising edge is detected, clock multiplexer 10 is latched high to signal VCC. Upon detecting the rising edge on the current clock signal, the appropriate hold edge detector then signals, by changing the state of its hold signal, that its corresponding ready edge detector should determine the rising edge on the selected clock signal. Then this corresponding ready edge detector circuit determines the rising edge on the selected clock signal. For example, when switching from clock signal clk0 to clock signal clk1, ready edge detector 1 circuit 30 would detect the rising edge on clock signal clk1 (subsequent to the change in hold signal hld0). After the rising edge on the selected clock is detected, the clock output signal is unlatched and the selected clock signal is passed by clock multiplexer 10. Thus, when switching from clock signal clk0 to clock signal clk1, clock multiplexer 10 would pass clock signal clk1 at this point. Similarly, if the current clock signal is clk1 and the selection signal sel is toggled, then hold edge detector 1 circuit 40 will detect the rising edge on clock signal clk1 and then change the state of hold signal hld1. Then, the clock output signal from clock multiplexer 10 is latched high to signal VCC. Ready edge detector 0 circuit 45 then detects the rising edge on clock signal clk0 (subsequent to the change in hold signal hld1). After the rising edge on clock signal clk0 is detected, clock output signal clk_out is unlatched so that clock multiplexer 10 may pass clock signal clk0 as the clock output signal clk_out.

As will be explained further herein, both types of edge detector circuits may detect either the falling or rising edge of their corresponding clock signal as determined by the state of signal fs0, which may be provided by a non-volatile or volatile memory cell. If the edge detector circuits detect a rising edge of their respective clock signals, then clock multiplexer system 5 is in the rising-edge-triggered mode. Conversely, if the edge detector circuits detect a falling edge of their respective clock signals, then clock multiplexer system 5 is in the falling-edge-triggered mode. The selection of these modes and other modes of operation may be determined not only by signal fs0 but by other signals as well. For example, in one embodiment, signals fs1 and fs2 control mode multiplexers 35 and 50, respectively. As a result of these signals, a number of operating modes may be selected as given by the following table:

| fs0 | fs1 | fs2 | output when sel = 0 | output when sel = 1 | mode summary |
| --- | --- | --- | --- | --- | --- |
| 0 | 0 | 0 | clk0 | clk1 | Falling-edge-triggered operation, latched state is low |
| 1 | 0 | 0 | clk0 | ckl1 | Rising-edge-triggered operation, latched state is high |
| 0 | 1 | 0 | 0 | clk1 | Sel is active high, disabled output state is low |
| 1 | 1 | 0 | 1 | clk1 | Sel is active high, disabled output state is high |
| 0 | 0 | 1 | clk0 | 0 | sel is active low, |

-continued

| fs0 | fs1 | fs2 | output when sel = 0 | output when sel = 1 | mode summary |
|---|---|---|---|---|---|
| 1 | 0 | 1 | clk0 | 1 | disabled output state is low sel is active low, disabled output state is high |

Regardless of whether a rising-edge-triggered or falling-edge-triggered mode is selected, the choice of denoting either type of edge detector circuits with either a "0" or a "1" is determined by the particular clock signal they monitor. Thus, hold edge detector 0 circuit 25 detects the edge (rising or falling) on clock signal clk0, hold edge detector 1 circuit 40 detects the edge (rising or falling) on clock signal clk1, ready edge detector 1 circuit 30 detects the edge on clock signal clk1, and ready edge detector 0 circuit 45 detects the edge on clock signal clk0. In summary, hold edge detector circuits 25 and 40 detect the edge on the current clock: if the current clock signal is clk0, then hold edge detector 0 circuit 25 detects the edge on the current clock signal, whereas if the current clock signal is clk1, then hold edge detector 1 circuit 40 detects the edge on the current clock signal. Similarly, the ready edge detector circuits detect the edge on the selected clock. Which particular ready edge detector circuit does this detection depends upon whether the selected clock signal is clk0 or clk1. When the hold edge detector circuits detect the edge in the current clock, they toggle their output signal hld such that hold edge detector 0 circuit 25 toggles output signal hld0 and hold edge detector 1 circuit 40 toggles output signal hld1. Should the selection signal sel toggle a second time before an edge is detected on the current clock, the current clock continues to be passed without interruption. If the selection signal sel toggles after the clock output signal clk_out has been latched (either high or low), the previous current clock signal will be passed as soon as an appropriate edge is detected. This results in the output being latched for at least one clock period of the previous clock and possibly as long as the sum of the periods of both clocks. A description of their respective timing and state diagrams aids in the understanding of the operation for glitch-free clock multiplexer system 5 and will now follow.

Figure 2A:
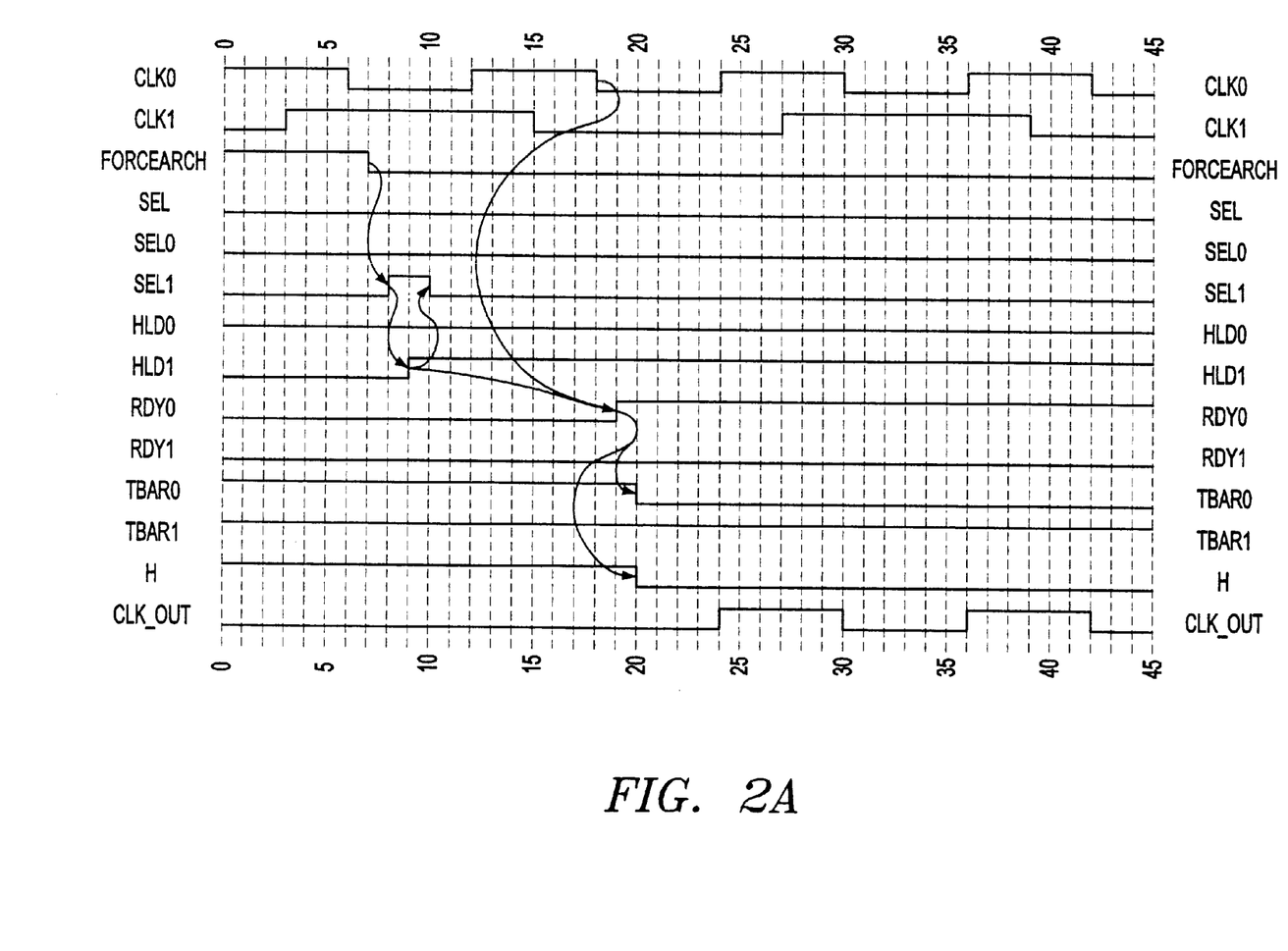
FIG. 2a is a timing diagram for a variety of control signals used in the clock multiplexer system of FIG. 1 during a startup transition.
Figure 2B:
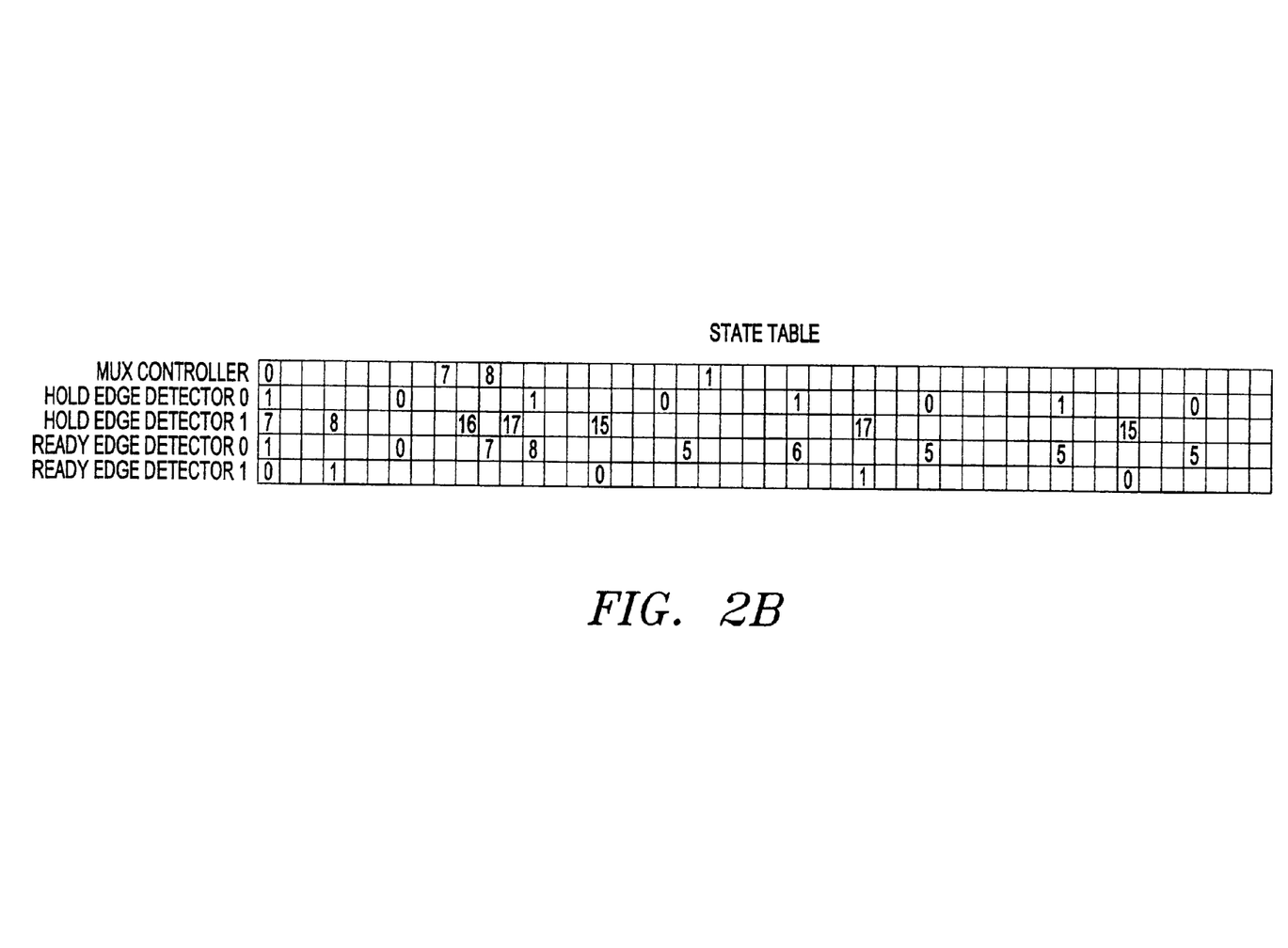
FIG. 2b is a state table corresponding to the timing diagram of FIG. 2a for a variety of the components in the clock multiplexer system of FIG. 1.
Figure 3:
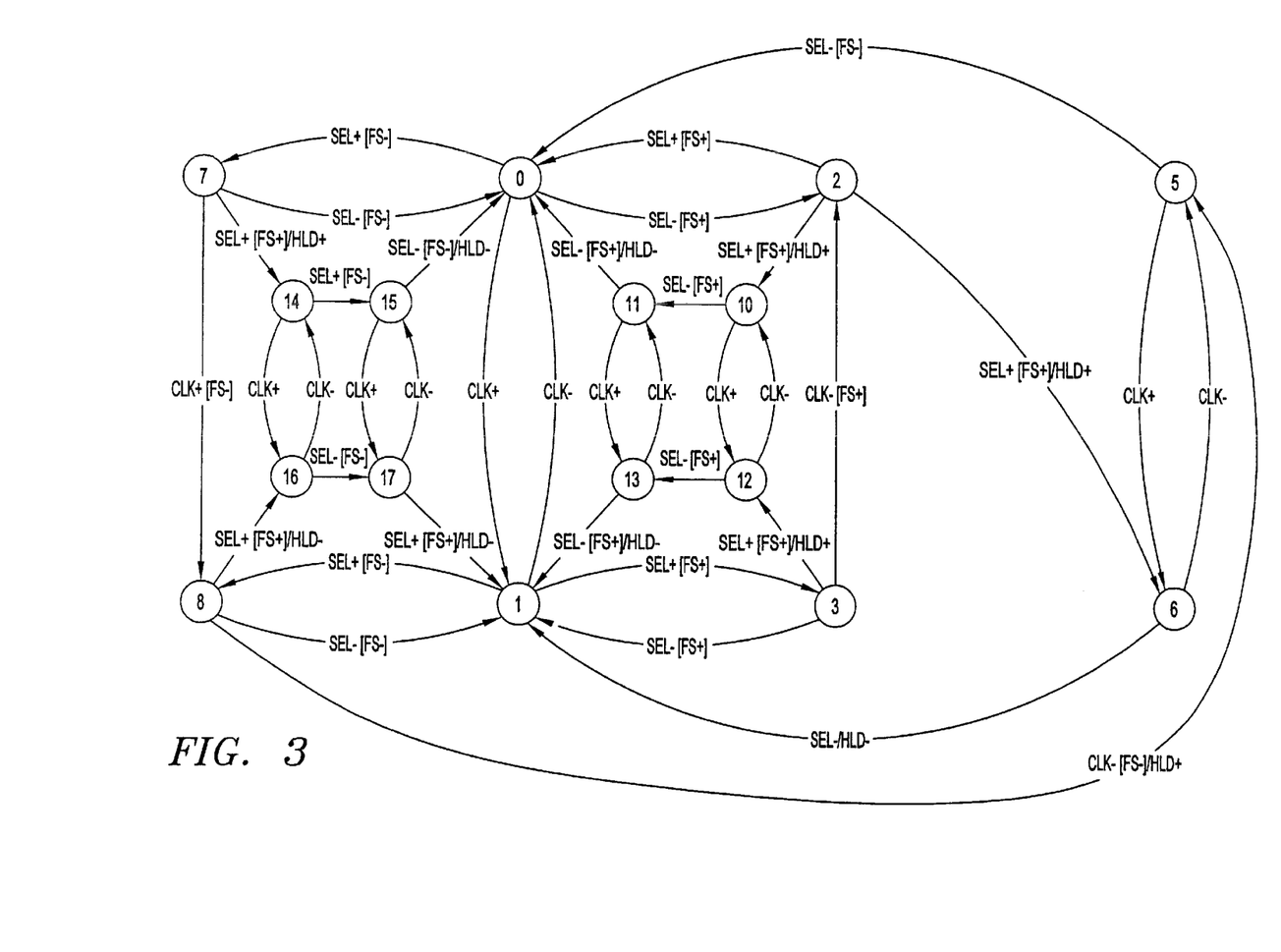
FIG. 3 is a state diagram for a hold edge detector component in the clock multiplexer system of FIG. 1.
Figure 4:
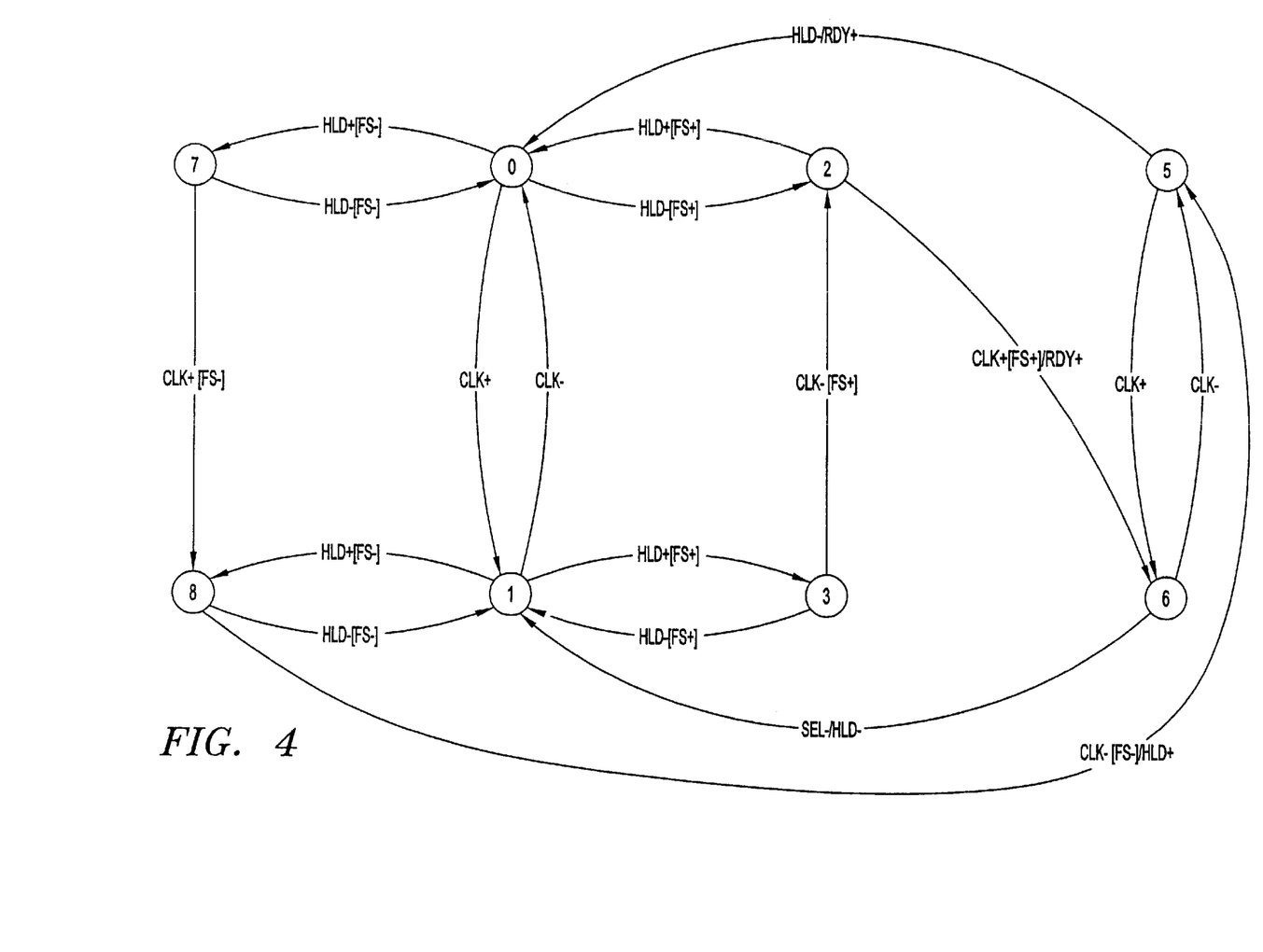
FIG. 4 is a state diagram for a ready edge detector component in the clock multiplexer system of FIG. 1.
Figure 5:
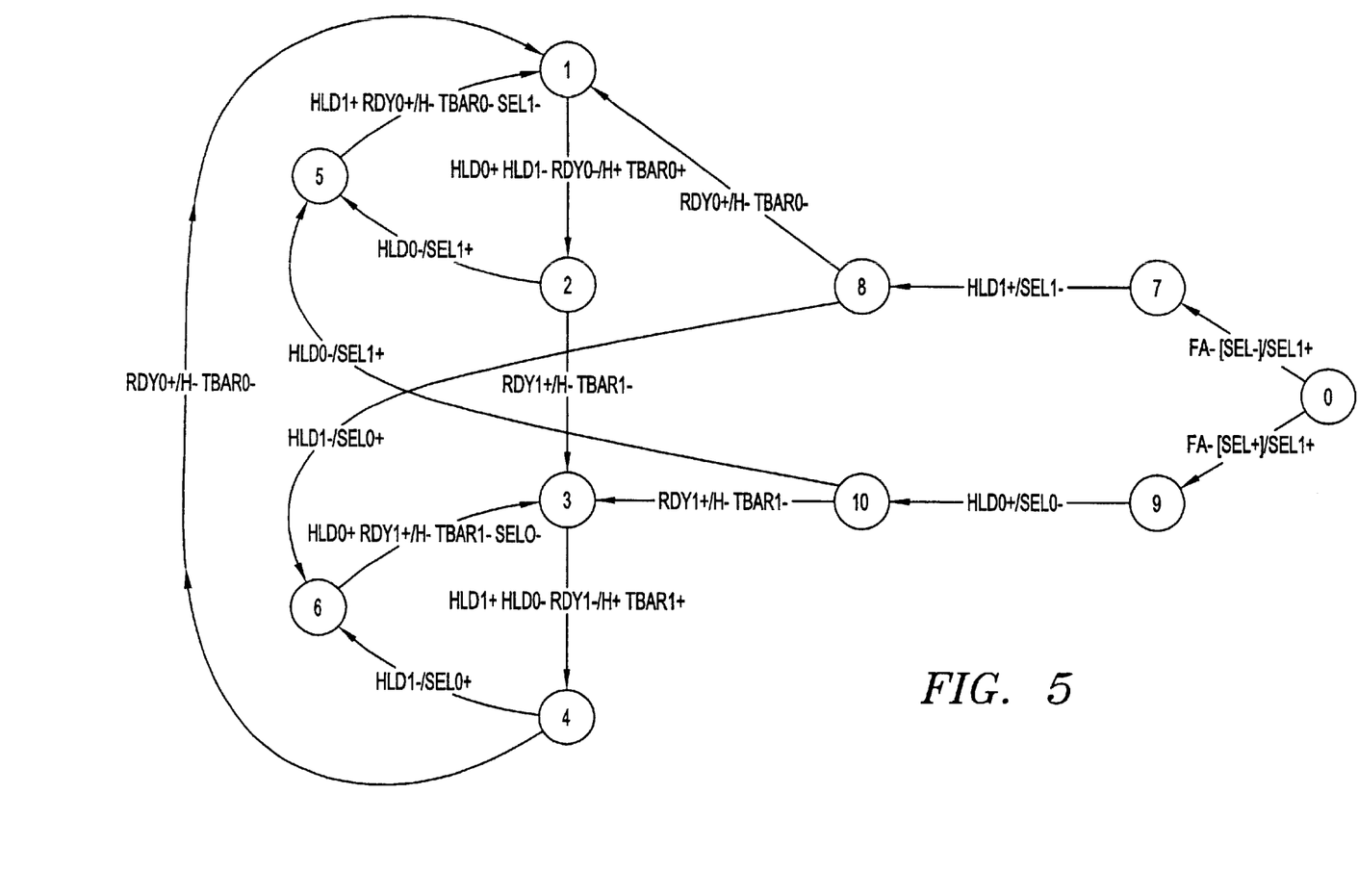
FIG. 5 is a state diagram for a clock multiplexer controller in the clock multiplexer system of FIG. 1.

1. Falling-Edge Triggered Operation a. Start up to Output clk0:

FIG. 2a is a timing diagram for a variety of the control signals used in clock multiplexer system 5. Corresponding to this timing diagram, FIG. 2b is a state table for the major components of clock multiplexer system 5. Reference will also be made to the state diagrams in FIGS. 3, 4, 5. Because of their generic roles, FIG. 3 is a state diagram for both hold edge detector circuits 25 and 40. Similarly, FIG.-4 is a state diagram for both ready edge detector circuits 30 and 45. FIG. 5 is a state diagram for multiplexer controller 20. At time (0), reset signal forcearch is held high until time (7) so that all mode signals fs0 through fs4 may be set and clock output signal is latched low. At time (3), clock signal clk1 has a rising edge, causing hold edge detector 1 circuit 40 to transition to state 8 and ready edge detector 1 circuit 40 to transition to state 1. At time (6), clock signal clk0 has a falling edge, causing both hold edge detector 0 circuit 25 and ready edge detector 0 circuit 45 to transition to state 0. When reset signal forearch has a falling edge at time (7), the condition of selection signal sel determines whether clock signal clk1 or clk0 will be passed by clock multiplexer 10 as clk_out. In this case, selection signal sel is low at time (7), causing multiplexer controller 20 to transition from state 0 to state 7 and drive signal set1 high. The rising edge in signal set1 causes hold edge detector 1 circuit 40 to transition to state 16 and drive hold signal high at time (9). The rising edge in hold signal hld1 causes multiplexer controller 20 to transition to state 8 and drive signal set1 low at time (10), thereby causing hold edge detector 1 circuit 40 to transition to state 17. The rising edge in hold signal hld1 also causes ready edge detector 0 circuit to transition to state 7. At time (12), clock signal clk0 has a rising edge, causing ready edge detector 0 circuit 45 to transition to state 8. At time (15), clock signal clk1 has a falling edge, causing hold edge detector 1 circuit 40 to transition to state 15. The subsequent falling edge in clock signal clk0 at time (18), coupled with hold signal hld1 being high, causes ready edge detector 0 circuit 45 to transition to state 5 and drive ready signal rdy0 high at time (19). As a result, multiplexer controller 20 transitions from state 8 to state 1 and drives signals h and tbar0 low at time (20). In response, clock multiplexer 10 unlatches clk_out and allows clock signal clk0 to pass.

Those of ordinary skill in the art will appreciate that an analogous state transition occurs from startup to producing clock signal clk1 as clk_out occurs as disclosed in the state diagrams in FIGS. 3 through 5.

b. Transition from Clock Signal clk0 to Clock Signal clk1 Waveforms:

Glitch-free clock multiplexer system 5 may be programmed to respond to either the rising or falling edge of the respective clock signals. This programming is controlled by the state of signal fs0, which is received by the assorted edge detector circuits and also clock multiplexer 10. In one embodiment, when signal fs0 is low, the operation of glitch-free clock multiplexer system 5 is triggered by clock falling edges. Conversely, when signal fs0 is high, the operation is triggered by rising edges of the clocks.

Figure 6A:
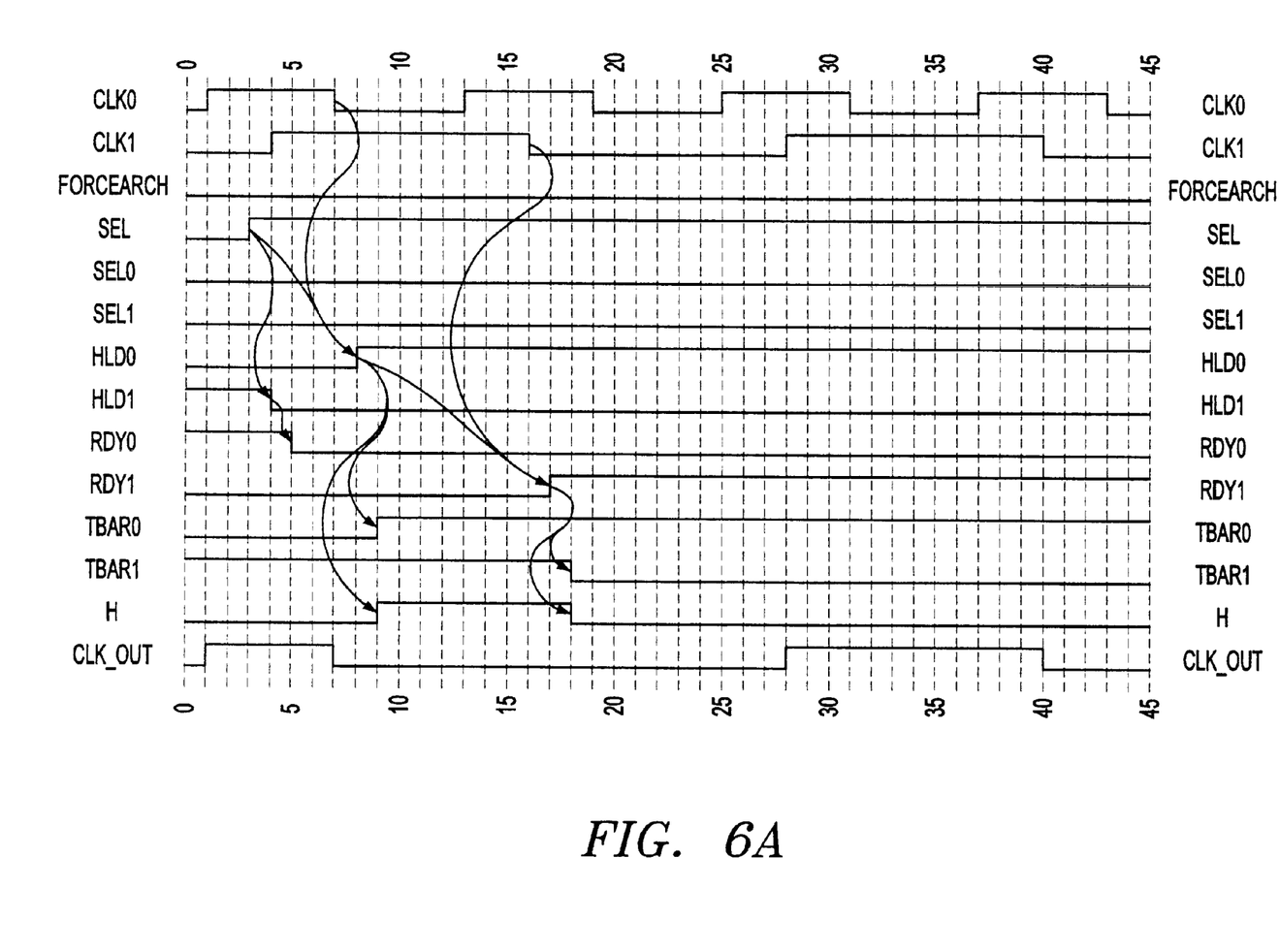
FIG. 6a is a timing diagram for falling-edge-triggered transition from a first clock signal to a second clock signal in the clock multiplexer system of FIG. 1.
Figure 6B:
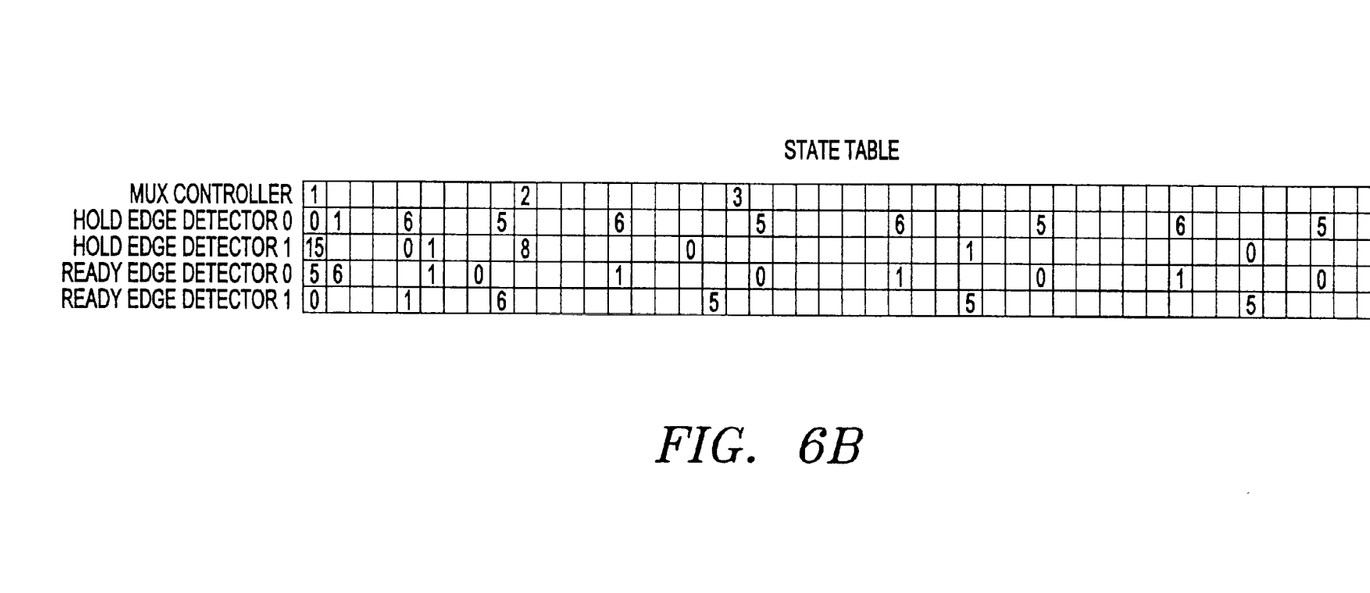
FIG. 6b is a state table corresponding to the timing diagram of FIG. 6a for various components in the clock multiplexer system of FIG. 1.

FIG. 6a is a timing diagram for a number of the signals used in the glitch-free clock multiplexer system 5 of FIG. 1 during a transition from clock signal clk0 to clk1 in the falling-edge-triggered mode of operation. Reference will also be made to the state diagrams in FIGS. 3, 4, 5. In addition, FIG. 6b is a state table corresponding to the timing diagram of FIG. 6a. FIG. 3 is a state diagram for the hold edge detector circuit (because of the generic constructions, this state diagram is applicable for both hold edge detector 0 circuit 25 and hold edge detector 1 circuit 40 of FIG. 1). FIG. 4 is a state diagram for the ready edge detector circuit (because the state diagrams are identical, this state diagram is applicable for both ready edge detector 1 circuit 30 and ready edge detector 0 circuit 45).

Figure 7A:
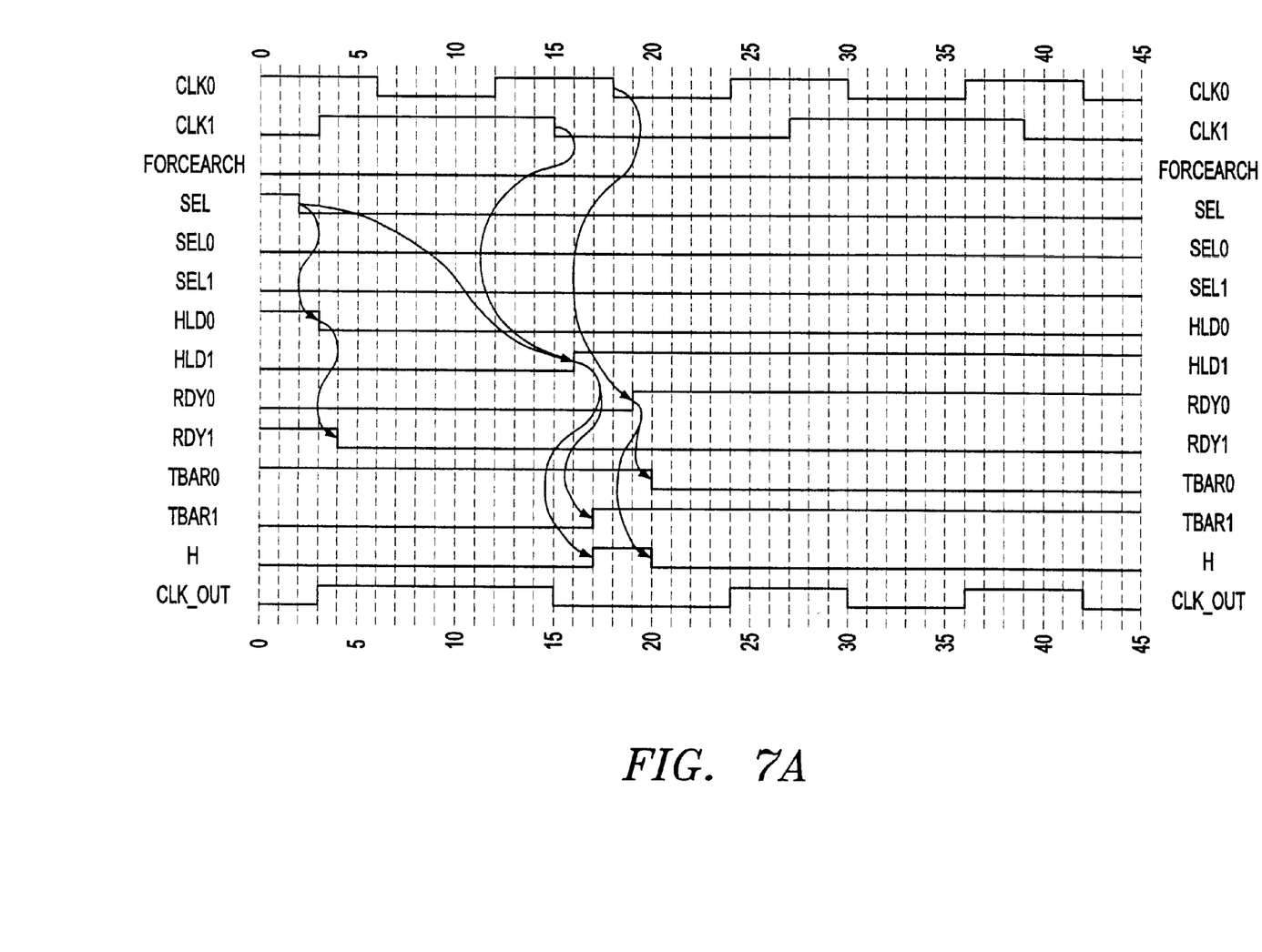
FIG. 7a is a timing diagram for a falling-edge-triggered transition from the first clock signal to the second clock signal in the clock multiplexer system of FIG. 1.
Figure 7B:
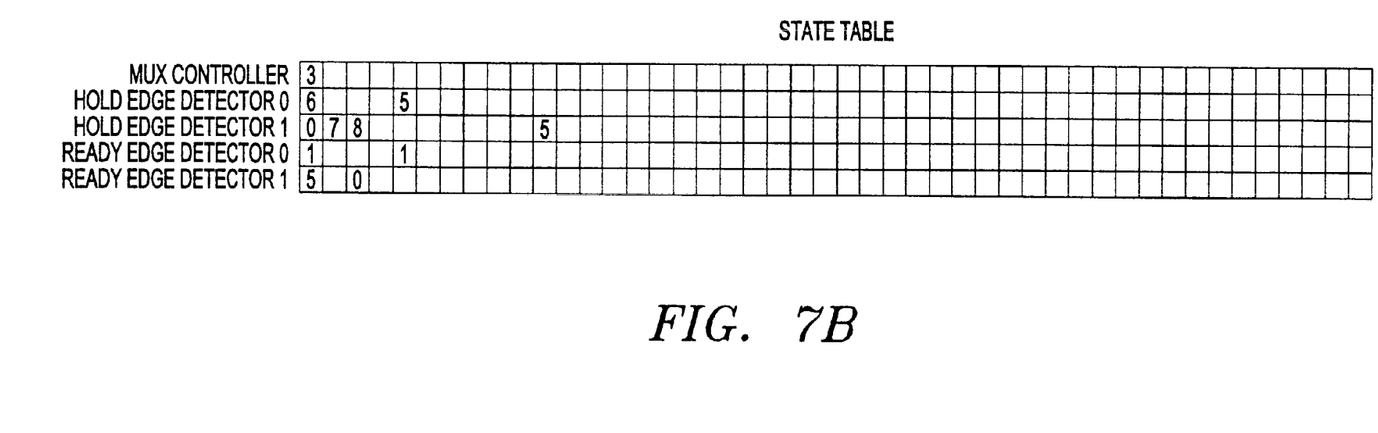
FIG. 7b is a state table corresponding to the timing diagram of FIG. 7a for various components in the clock multiplexer system of FIG. 1.

At time (0), multiplexer controller 20 is in state 1 such that it passes clock signal clk0 as the clock output signal clk_out. Hold edge detector 0 circuit 25 is in state 0, hold edge detector 1 circuit 40 is in state 15, ready edge detector 0 circuit 45 is in state 5, and ready edge detector 1 circuit 30 is in state 0. At time (1), clock signal clk0 has a rising edge. Corresponding to this rising edge, hold edge detector 0 circuit 25 transitions to state 1, and ready edge detector 0 circuit 45 transitions to state 6. At time (3) selection signal sel toggles from low to high to signify that a transition from clock signal clk0 to clock signal clk1 is desired. Because clock signal clk0 is the current clock, hold edge detector 0 circuit 25 will locate the falling edge for this clock signal. Thus, corresponding to the rising edge on selection signal sel, hold edge detector 0 circuit 25 transitions to state 8. In addition, hold edge detector 1 circuit 40 transitions to state 0 so as to lower hold signal hld1 (note that the selection signal sel is inverted at the input to hold edge detector 1 circuit 40). At time (4), clock signal clk1 has a rising edge causing hold edge detector 1 circuit 40 to transition to state 0 and ready edge detector 1 circuit 30 to transition to state 1. Because hold signal hld1 had a falling edge at time (4), ready edge detector 0 circuit 45 transitions to state 1 and lowers ready signal rdy0 at time (5). At time (7), clock signal clk0 has its falling edge. Thus, at this time hold edge detector 0 circuit 25 transitions to state 5 and raises hold signal hld0. In turn, the change in hold signal hld0 combined with the conditions of hold signal hld1 and ready signal rdy0 causes multiplexer controller 20 to transition to state 2, thus raising signals tbar0 and h at time (9). In response, clock multiplexer 10 latches clock output signal clk_out low. The change in hold signal also causes ready edge detector 1 circuit 30 to transition to state 8. At time (13) clock signal clk0 rises, causing hold edge detector 0 circuit 25 to transition to state 6 and ready edge detector 0 circuit 45 to transition to state 1. At time (16), clock signal clk1 falls, thereby causing ready edge detector 1 circuit 30 to transition to state 5 and raise ready signal rdy1 at time (17). At this time the selected clock signal clk1 has gone low and thus matches the latched output of the clock multiplexer 20. Accordingly, multiplexer controller 20 responds to the change in ready signal rdy1 by transitioning to state 3, thereby lowering signals tbar1 and h at time (18). In response clock multiplexer 10 allows clock signal clk1 to pass as the clock output signal clk_out.

c. Transition from clock signal clk1 to clock signal clk0 to waveforms:

FIG. 7a is a timing diagram for a number of the signals used in the glitch-free clock multiplexer system 5 during this transition. Reference will also be made to the state diagrams in FIGS. 3, 4, 5. In addition, FIG. 7b is a state table corresponding to the timing diagram of FIG. 6a. At time (0), multiplexer controller 20 is in state 3, hold edge detector 0 circuit 25 is in state 6, ready edge detector 1 circuit 30 is in state 5, ready edge detector 0 circuit 45 is in state 1, and hold edge detector 1 circuit 40 is in state 0. At time (2), selection signal toggles low. In response, hold edge detector 1 circuit 40 transitions to state 7 (note that the selection signal sel is inverted at its input to hold edge detector 1 circuit 40). Also, hold edge detector 0 circuit 25 transitions to state 1 and lowers hold signal hld0 at time (3). The change in hold signal hld0 causes ready edge detector 1 circuit 30 to transition to state 0 and lower ready signal rdy1 at time (4). Clock signal clk1 going high at time (3) causes hold edge detector 1 circuit 40 to transition to state 8 at time (4). At time (15), clock signal clk1 goes low. Thus, hold edge detector 1 circuit 40 transitions to state 5 and raises hold signal hld1 at time (16). In response, multiplexer controller 20 transitions to state 4 and raises signals h and tbar1. Clock multiplexer 10 responds to the changes in signals h and tbar1 by latching clock output signal clk_out low. Also in response to the change in hold signal hld1, ready edge detector 0 circuit 45 transitions to state 8 at time (17). At time (18), clock signal clk0 goes low. In turn, ready edge detector 0 circuit 45 transitions to state 5 and raises ready signal rdy0. The change in ready signal rdy0 causes multiplexer controller 20 to transition to state 1 and lower signals h and tbar0. In response, clock multiplexer 10 allows clock signal clk0 to pass as clock output signal clk_out.

2. Rising-Edge Triggered Operation

Should clock multiplexer system 5 be in the rising-edge-triggered mode of operation while selection signal sel is toggled, the rising edge on the current clock will determine when clock output signal clk_out may be latched high. The rising edge on the selected clock will then determine when the selected clock may be passed as clock output signal clk_out. Because the embodiment illustrated for clock multiplexer system 5 of FIG. 1 will be in rising-edge-triggered operation when signal fs0 is high, the appropriate state transitions for this mode in FIGS. 3 and 4 are denoted with the annotation [fs+].

Regardless of the mode of operation, those of ordinary skill in the art will appreciate that the state diagrams of FIGS. 3 through 5 may be readily altered and still be within the scope of the present invention. For example, states may be combined or additional states may be added. Given an appropriate state diagram, numerous software tools may be used to derive a hardware implementation of the required state machine for the hold edge detectors 25 and 40, the ready edge detectors 30 and 45, and the multiplexer controller 20.

Accordingly, although the invention has been described with respect to particular embodiments, this description is only an example of the invention's application and should not be taken as a limitation. Consequently, the scope of the invention is set forth in the following claims.

What is claimed is:

1. A clock multiplexer system, comprising:
 a clock multiplexer operable to select between a first and a second clock signal input and to provide a clock signal output responsive to a selection signal, wherein the two clock signal inputs represent a current clock signal corresponding to the clock signal output and a remaining selected clock signal;
 a first edge detector operable to detect a clock edge of a specified type on the current clock signal responsive to the selection signal;
 a second edge detector operable to detect a clock edge of the specified type on the selected clock signal responsive to an indication from the first edge detector that the clock edge of the specified type on the current clock signal has been detected; and
 a controller configured to control the selection of the two clock signal inputs by the clock multiplexer.

2. The clock multiplexer system of claim 1, wherein the clock edge of the specified type is a falling edge and the controller is configured to command the clock multiplexer to hold the output clock signal low after the first edge detector detects a falling clock edge on the current clock signal and, subsequent to this detection by the first edge detector, to command the clock multiplexer to select the selected clock signal after the second edge detector detects a falling clock edge on the selected clock signal.

3. The clock multiplexer system of claim 1, wherein the clock edge of the specified type is a rising edge and the controller is configured to command the clock multiplexer to hold the output clock signal high after the first edge detector detects a rising clock edge on the current clock signal and, subsequent to this detection by the first edge detector, to command the clock multiplexer to select the selected clock signal after the second edge detector detects a rising clock edge on the selected clock signal.

4. The clock multiplexer system of claim 2, wherein the first edge detector comprises a first set of edge detectors such that a first edge detector circuit in the first set detects a falling clock edge on the first clock signal input and a second edge detector circuit in the first set detects a falling clock edge on the second clock signal input.

5. The clock multiplexer system of claim 4, wherein the second edge detector circuit comprises a second set of edge detector circuits such that a first edge detector circuit in the second set detects a falling clock edge on the first clock signal input and a second edge detector circuit in the second set detects a falling clock edge on the second clock signal input.

6. The clock multiplexer system of claim 5, wherein the clock multiplexer receives a signal VSS and holds its output clock signal low by selecting signal VSS.

7. The clock multiplexer system of claim 2, wherein the first and second clock input signals and the selection signal are asynchronous.

8. The clock multiplexer system of claim 6, wherein the edge detector circuits do not comprise flip-flops.

9. The clock multiplexer system of claim 5, wherein the controller is configured to command the clock multiplexer to pass the current clock signal without interruption if the selection signal changes states again before the first edge detector circuit detects a falling clock edge on the current clock signal.

10. The clock multiplexer system of claim 3, wherein the first edge detector comprises a first set of edge detectors such that a first edge detector circuit in the first set detects a rising clock edge on the first clock signal input and a second edge detector circuit in the first set detects a rising clock edge on the second clock signal input.

11. The clock multiplexer system of claim 10, wherein the second edge detector circuit comprises a second set of edge detector circuits such that a first edge detector circuit in the second set detects a rising clock edge on the first clock signal input and a second edge detector circuit in the second set detects a rising clock edge on the second clock signal input.

12. The clock multiplexer system of claim 11, wherein the clock multiplexer receives a signal VCC and holds its output clock signal high by selecting signal VCC.

13. The clock multiplexer system of claim 12, wherein the edge detector circuits do not comprise flip-flops.

14. A method of selecting between two clock signal inputs to produce an output clock signal, wherein the two clock signal inputs represent a current clock signal corresponding to the clock signal output and a remaining selected clock signal, comprising:

(a) detecting a clock edge of a specified type in the current clock signal; and subsequent to act (a):

(b) if the specified type of clock edge is a falling clock edge, holding the output clock signal low, and if specified type of clock edge is a rising clock edge, holding the output clock signal high; and (c) detecting an edge of the specified type in the selected clock signal; and subsequent to act (c):

(d) releasing the hold on the output clock signal from act (b) and passing the selected clock signal as the clock output signal.

15. The method of claim 14, wherein the specified type of clock edge is a falling clock edge.

16. The method of claim 14, wherein the specified type of clock edge is a rising clock edge.

17. The method of claim 14, wherein act (a) is responsive to a selection signal for selecting between the two clock signal inputs.

* * * * *